(12) United States Patent
Nakata et al.

(10) Patent No.: US 8,602,547 B2
(45) Date of Patent: Dec. 10, 2013

(54) INK, INK CARTRIDGE, AND INK JET RECORDING METHOD

(75) Inventors: Eiichi Nakata, Kawasaki (JP); Hideki Takayama, Fujisawa (JP); Yoshio Nakajima, Yokohama (JP); Yuhei Shimizu, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 141 days.

(21) Appl. No.: 13/216,914

(22) Filed: Aug. 24, 2011

(65) Prior Publication Data

US 2012/0050387 A1    Mar. 1, 2012

(30) Foreign Application Priority Data

Aug. 31, 2010    (JP) ................................. 2010-194534

(51) Int. Cl.
*C09D 1/00*    (2006.01)

(52) U.S. Cl.
USPC ........................................................ 347/100

(58) Field of Classification Search
USPC ........................................................ 347/100
See application file for complete search history.

(56) References Cited

U.S. PATENT DOCUMENTS

| | | |
|---|---|---|
| 6,074,052 A | 6/2000 | Inui et al. |
| 6,426,375 B1 | 7/2002 | Kubota |
| 6,698,876 B2 | 3/2004 | Sato et al. |
| 6,848,781 B2 | 2/2005 | Ogino et al. |
| 6,874,881 B2 | 4/2005 | Suzuki et al. |
| 7,029,109 B2 | 4/2006 | Shirota et al. |
| 7,052,536 B2 | 5/2006 | Yatake |
| 7,055,943 B2 | 6/2006 | Suzuki et al. |
| 7,144,452 B2 | 12/2006 | Takayama et al. |
| 7,198,664 B2 | 4/2007 | Mafune et al. |
| 7,198,665 B2 | 4/2007 | Nakamura et al. |
| 7,247,196 B2 | 7/2007 | Sato et al. |
| 7,291,211 B2 | 11/2007 | Kaneko et al. |
| 7,291,214 B2 | 11/2007 | Tsuji et al. |
| 7,291,361 B2 | 11/2007 | Ogino et al. |
| 7,297,202 B2 | 11/2007 | Ichinose et al. |
| 7,381,257 B2 | 6/2008 | Takayama et al. |
| 7,402,200 B2 | 7/2008 | Imai et al. |
| 7,578,876 B2 | 8/2009 | Nakajima et al. |
| 7,615,113 B2 | 11/2009 | Aikawa et al. |
| 7,854,798 B2 | 12/2010 | Udagawa et al. |
| 7,868,060 B2 | 1/2011 | Sakai et al. |
| 7,909,449 B2 | 3/2011 | Sato et al. |
| 2001/0025588 A1* | 10/2001 | Takemoto et al. ......... 106/31.36 |
| 2004/0186200 A1 | 9/2004 | Yatake |
| 2009/0258145 A1 | 10/2009 | Mukae et al. |
| 2009/0274839 A1 | 11/2009 | Nakata et al. |
| 2009/0297712 A1* | 12/2009 | Kasahara et al. ............. 427/256 |
| 2010/0053288 A1 | 3/2010 | Ohzeki et al. |
| 2010/0068389 A1 | 3/2010 | Ohzeki et al. |
| 2010/0086689 A1 | 4/2010 | Ohta |
| 2010/0143592 A1 | 6/2010 | Arai et al. |
| 2010/0196604 A1 | 8/2010 | Kariya et al. |
| 2011/0001775 A1 | 1/2011 | Nishiwaki et al. |

FOREIGN PATENT DOCUMENTS

| | | |
|---|---|---|
| EP | 1 041 126 A2 | 10/2000 |
| EP | 1 908 806 A1 | 4/2008 |
| EP | 2 174 997 A1 | 4/2010 |
| EP | 2 216 373 A1 | 8/2010 |
| EP | 2 270 109 A1 | 1/2011 |
| JP | 2004-238445 A | 8/2004 |
| JP | 2005-194500 A | 7/2005 |

OTHER PUBLICATIONS

Dec. 6, 2011 European Search Report in European Patent Appln. No. 11006985.3.

* cited by examiner

*Primary Examiner* — Laura Martin

(74) *Attorney, Agent, or Firm* — Fitzpatrick, Cella, Harper & Scinto

(57) ABSTRACT

Provided are an ink suitable for ink jet recording with which a color image excellent in both color developability and glossiness can be recorded, and an ink cartridge and an ink jet recording method in each of which the ink is utilized. Specifically, provided are an ink including: an organic pigment; a resin for dispersing the organic pigment; and a resin fine particle, in which an average particle diameter of the resin fine particle is 0.60 time or more and 1.2 times or less as large as an average particle diameter of the organic pigment, and an ink cartridge and an ink jet recording method in each of which the ink is utilized.

14 Claims, No Drawings

INK, INK CARTRIDGE, AND INK JET RECORDING METHOD

BACKGROUND OF THE INVENTION

1. Field of the Invention

The present invention relates to an ink suitable for ink jet recording, and an ink cartridge and an ink jet recording method using the ink.

2. Description of the Related Art

In recent years, a pigment ink containing an organic pigment as a coloring material has started to be widely used as a color ink for use in an ink jet recording method for the purposes of additionally improving the fastness properties of an image such as gas resistance and light fastness. In the pigment ink, the organic pigment is dispersed in an aqueous medium by means of, for example, a water-soluble resin as a dispersant, encapsulation with the resin, or the modification of the surface of a pigment particle with the resin. In general, however, an image recorded with the pigment ink involves the following problem. The color developability of the image is insufficient as compared with that in the case of a dye ink. In addition, the following problem arises owing to the fact that the pigment is a particle. The glossiness of each of images recorded on recording media each having a glossy surface (so-called glossy papers) with the pigment ink is particularly insufficient as compared with that in the case of the dye ink. It should be noted that the term "glossiness" as used herein refers to the 20° gloss value of an image, and the image can be regarded as being excellent in glossiness when the 20° gloss value is 50 or more. The value can be measured with, for example, a Microhazemeter (manufactured by BYK-Gardner GmbH).

Various investigations have been heretofore conducted on the above-mentioned problems. With regard to, for example, the color developability of an image, the following pigment ink has been proposed (see Japanese Patent Application Laid-Open No. 2004-238445). Resin fine particles are added to the pigment ink, and a ratio between the particle diameters of a pigment and a resin fine particle is set to fall within such a specific range that the color developability of an image in the so-called plain paper is improved. In addition, with regard to the glossiness of an image, the following ink prescription has been proposed (see Japanese Patent Application Laid-Open No. 2005-194500). A 1,2-alkanediol is added to a pigment ink so that the smoothness of an ink dot in a recording medium may be improved and the glossiness of the image may be improved.

SUMMARY OF THE INVENTION

However, investigations conducted by the inventors of the present invention have found that the prior art listed above has been unable to achieve a high level of compatibility between color developability and glossiness particularly in an image recorded on a recording medium having a glossy surface (hereinafter referred to as "glossy paper"). The pigment ink that improves the color developability of an image proposed in Japanese Patent Application Laid-Open No. 2004-238445 described above, which is an ink formed of a self-dispersible pigment and resin fine particles obtained by an emulsion polymerization method, has been insufficient in terms of the glossiness of an image in the glossy paper, though the ink can improve the color developability of a monochromatic image in plain paper. In addition, according to the investigations conducted by the inventors of the present invention, the color developability of the image recorded on the glossy paper with the ink could not be improved to a level requested in recent years unlike the image recorded on the plain paper. In addition, the ink said to have improved the glossiness of an image described in Japanese Patent Application Laid-Open No. 2005-194500 could not improve the color developability of an image recorded on the glossy paper, though the ink was able to improve the glossiness of the image.

Therefore, an object of the present invention is to provide an ink suitable for ink jet recording with which a color image excellent in both color developability and glossiness can be recorded, and an ink cartridge and an ink jet recording method in each of which the ink is utilized.

The above-mentioned object is achieved by the present invention described below. That is, the present invention provides an ink including: an organic pigment; a resin for dispersing the organic pigment; and a resin fine particle, in which an average particle diameter of the resin fine particle is 0.60 time or more and 1.2 times or less as large as an average particle diameter of the organic pigment, and an ink cartridge and an ink jet recording method in each of which the ink is utilized.

According to the present invention, there is provided an ink suitable for ink jet recording with which even a color image excellent in both color developability and glossiness can be recorded. According to the present invention, there are provided an ink cartridge and an ink jet recording method in each of which the ink is utilized to enable the provision of an excellent image that achieves compatibility between color developability and glossiness.

Further features of the present invention will become apparent from the following description of exemplary embodiments.

DESCRIPTION OF THE EMBODIMENTS

Hereinafter, the present invention is described in detail by taking a preferred embodiment of the present invention as an example. It should be noted that the term "average particle diameter" as used in the present invention refers to an average particle diameter (D50) on a volume basis, which is the 50% cumulative value of a particle diameter distribution.

First, the inventors of the present invention have paid attention to a difference in color developability between a dye ink excellent in the color developability of an image and a pigment ink insufficient in terms of the color developability of an image as compared with the dye ink in improving the color developability of an image. First, unlike the dye ink containing, as a coloring material, a dye that dissolves in an aqueous medium and fixes to the receiving layer of a recording medium, the pigment ink is such that its pigment particles having an average particle diameter of about 100 nm fix onto the surface of a recording medium to produce irregularities on the surface of an image. Then, the irregularities produced on the surface of the image cause "surface scattering" upon incidence of light on the surface of the image. In addition, voids in which air as well as the pigment is included are dispersed in a pigment layer that forms the image, and the voids cause "internal scattering." Here, unlike a monochromatic image having such a feature that causing the image to absorb light is of importance, in the case of a color image, to cause an image formed by the pigment layer formed of the pigment particles to reflect only light having the color development wavelength of the image is important in improving the color developability of the image. To this end, the inventors of the present invention have considered that the color developability of the image can be improved by the following. The above-mentioned scattering resulting from the voids formed in the pigment layer or the irregularities on the surface of the image is effectively suppressed so that a reduction in the quantity of reflected light due to the scattering and reflected light having a complementary color different from a color to be originally developed may be suppressed.

In view of the foregoing, the inventors of the present invention have considered first of all that the incorporation of a resin fine particle into the pigment ink to fill the irregularities on the surface of the pigment layer with the resin fine particle can achieve the smoothening of the surface of the image, and hence can suppress the "surface scattering" resulting from the irregularities. In addition, the inventors of the present invention have considered that the "internal scattering" that occurs owing to the voids formed in the pigment layer can also be suppressed when the voids can be filled with the resin fine particle.

In view of the foregoing, the inventors of the present invention have conducted investigations by paying attention to a relationship between the average particle diameters of a pigment and a resin fine particle to be incorporated into an ink. As a result, the inventors of the present invention have found that sufficient color developability is not obtained in an ink using a resin fine particle considerably larger than a pigment. Specifically, when such a resin fine particle to be incorporated into an ink that the average particle diameter of the resin fine particle was more than 1.2 times as large as the average particle diameter of a pigment were added to the ink, the addition of the resin fine particle showed no improvement in color developability.

Subsequent to the foregoing, the inventors of the present invention have investigated an ink containing a resin fine particle considerably smaller than a pigment. As a result, a slight improvement in color developability was observed. In addition, the inventors of the present invention have found that the color developability of an image is improved particularly when the average particle diameter of the resin fine particle to be incorporated into the ink is 0.60 time or more and 1.2 times or less as large as the average particle diameter of pigment particles. Further, the inventors of the present invention have found that the use of the resin fine particle whose average particle diameter falls within such ratio range improves the glossiness of an image recorded on glossy paper as well. The inventors of the present invention have considered the reason why the color developability of the image was improved by the above-mentioned procedure to be as described below. The addition of the resin fine particle whose average particle diameter was 0.60 time or more and 1.2 times or less as large as the average particle diameter of the pigment particles to the ink enabled the resin fine particle to fill such voids in a pigment layer and irregularities on the surface of the pigment layer as described in the foregoing, which may have resulted in the suppression of light scattering and the improvement of the color developability.

In addition, the reason why the glossiness of the image was improved in the above-mentioned case is the same as the foregoing. The resin fine particle having an appropriate size was able to smoothen the irregularities on the surface of the image effectively so that reflection efficiency on the surface of the image was improved, and as a result, the glossiness of the image may have been improved. Further, the improvement of the glossiness may be attributable to the achievement of an improvement in the refractive index of the surface of the image through the filling of the voids in the pigment layer with the resin fine particle as well as to the foregoing. In other words, filling the voids in the pigment layer with the resin fine particle having a refractive index higher than that of air was able to improve the refractive index of the entirety of the pigment layer, and as a result, the glossiness (20° gloss value) may have been improved.

Unlike a black ink using an inorganic pigment such as carbon black, the pigment having a high refractive index, a color ink uses an organic pigment whose refractive index is lower than that of the inorganic pigment as a main coloring material, and hence the refractive index of a color image portion is generally lower than that of a monochromatic image portion. Accordingly, there arises a difference in gloss between the color image portion having the lower refractive index and the monochromatic image portion having the higher refractive index upon recording of an image such as a photograph on glossy paper, and hence gloss unevenness may occur in an entire full-color image. In contrast, the use of an ink of the present invention can increase the refractive index of the pigment layer of a color image to be formed to narrow a difference in glossiness with a monochromatic image as described in the foregoing. As a result, the glossiness of the image is improved, and its uniformity also becomes satisfactory.

<Ink>

Hereinafter, each component that forms the ink of the present invention that is suitable for ink jet recording, and the like are described. It should be noted that an organic pigment may be simply described as a pigment in the following description.

(Organic Pigment and Resin for Dispersing the Pigment)

A coloring material to be used in the ink of the present invention is an organic pigment, and the average particle diameter of the resin fine particle must be 0.60 time or more and 1.2 times or less as large as the average particle diameter of the organic pigment. In addition, the above-mentioned organic pigment is dispersed in the ink, more specifically an aqueous medium by using a resin. Hereinafter, the pigment to be dispersed with the resin may be referred to as "resin-dispersed pigment." Various forms of the resin-dispersed pigment are described later.

As described in the foregoing, to efficiently fill the voids in the pigment layer and the irregularities on the surface of the pigment layer with the resin fine particle is important in improving the color developability and glossiness of the image recorded with the color ink. At that time, as the sizes and frequency of the voids in the pigment layer, and a height difference between the irregularities on the surface of the pigment layer reduce, the efficiency with which these voids and irregularities are filled with the resin fine particle may be improved. Here, comparison between the case where the resin-dispersed pigment is used as a coloring material for the ink and the case where a self-dispersible pigment is used shows that the agglomerated states of the pigments upon recording on, for example, a recording medium having a glossy surface differ from each other. That is, the self-dispersible pigment that is dispersed by electrostatic repulsion caused by an anionic group chemically bonded to the surface of a pigment particle remarkably agglomerates when the pigment reacts with a cation in the recording medium so that the electrostatic repulsion may be lost. Accordingly, when the self-dispersible pigment is used, voids in a pigment layer become large, and a pigment layer having a large height difference between the irregularities on its surface is formed.

In contrast, the resin-dispersed pigment agglomerates moderately as compared with the self-dispersible pigment upon reaction with the cation in the recording medium because the pigment receives both actions of electrostatic repulsion caused by an anionic group of the resin and the steric repulsion of the resin. Accordingly, in the case where the resin-dispersed pigment is used as a coloring material for the ink like the present invention, voids in a pigment layer become small, and a height difference between irregularities on the surface of the pigment layer also becomes small as compared with those in the case where the self-dispersible pigment is used. Therefore, in order that voids in a pigment layer and irregularities on the surface of the pigment layer may be filled with the resin fine particle, the resin-dispersed pigment that makes the voids in the pigment layer and a height difference between the irregularities on the surface of the pigment layer smaller is suitably used. The resin-dispersed pigment is used in the present invention by reason of the foregoing.

A water-soluble resin capable of stably dispersing the organic pigment in the aqueous medium that forms the ink by an action of an anionic group is suitably used as the resin to be used for dispersing the organic pigment, i.e., a resin dispersant. It should be noted that a state in which a resin is water-soluble in the present invention means that when the resin is neutralized with an alkali whose amount is equivalent to its acid value, the resin has no particle diameter. A resin that satisfies such condition is described as a water-soluble resin in the specification. The content (mass %) of the resin dispersant in the ink is preferably 0.1 mass % or more and 10.0 mass % or less based on the total mass of the ink.

The resin to be used as a dispersant preferably has at least such a hydrophilic unit and a hydrophobic unit as listed below as constituent units. It should be noted that the term "(meth)acryl" as used herein refers to "acryl" and "methacryl."

Examples of the monomer serving as the hydrophilic unit after the polymerization include acid monomers including carboxy group-containing monomers such as (meth)acrylic acid, itaconic acid, maleic acid, and fumaric acid, sulfonic acid group-containing monomers such as styrenesulfonic acid, phosphonic acid group-containing monomers such as (meth)acrylic acid-2-phosphonic acid ethyl ester, anhydrides and salts of those acid monomers, and other anionic monomers. It should be noted that constituent cations of the salts of the acid monomers are, for example, lithium, sodium, potassium, ammonium, and organic ammonium ions.

Further, examples of the monomer serving as the hydrophobic unit after the polymerization include aromatic ring-containing monomers such as styrene, α-methylstyrene, vinylnaphthalene, and benzyl(meth)acrylate, and (meth)acrylic acid esters of aliphatic alcohol, such as ethyl(meth)acrylate, methyl(meth)acrylate, (iso)propyl(meth)acrylate, (n-, iso-, or t-)butyl(meth)acrylate, and 2-ethylhexyl(meth)acrylate.

In the present invention, an acrylic, water-soluble resin having at least an acrylic component such as a hydrophilic unit derived from (meth)acrylic acid or a unit derived from a (meth)acrylic ester of an aliphatic alcohol is preferably used. Further, a copolymer having at least a hydrophilic unit derived from (meth)acrylic acid and a hydrophobic unit derived from a monomer having an aromatic ring such as styrene, α-methyl styrene, or benzyl(meth)acrylate is particularly suitably used.

The resin to be used as a dispersant in the present invention preferably has a weight average molecular weight of 1,000 or more and 30,000 or less. In addition, the resin to be used as a dispersant has an acid value of preferably 50 mgKOH/g or more and 300 mgKOH/g or less, more preferably 120 mgKOH/g or more and 250 mgKOH/g or less.

The ink of the present invention contains a resin for dispersing the organic pigment in the ink, more specifically an aqueous medium. The manner in which the organic pigment is dispersed is not limited to such that the organic pigment is dispersed by causing the resin dispersant to physically adsorb to the surface of a particle of the organic pigment, and may be such that the pigment is dispersed by using the resin. That is, a microcapsule pigment, resin-bonding type pigment, or the like as well as the above-mentioned resin-dispersed pigment using a resin as a dispersant can be used. The term "microcapsule pigment" as used herein refers to a pigment to be dispersed by being turned into a microcapsule through the coating of the pigment with a resin or a polymer, and the term "resin-bonding type pigment" as used herein refers to such a pigment that an organic group containing a polymer is chemically bonded to the surface of a pigment particle. Of course, the pigments listed above that are to be dispersed by different methods with resins can be used in combination. It should be noted that resin fine particle to be described later does not need to contribute to the dispersion of the organic pigment, and no resin fine particle preferably adsorbs to the surfaces of the particles of the organic pigment.

The coloring material to be used in the ink of the present invention is not an inorganic pigment such as titanium oxide or carbon black but an organic pigment, and hence the ink has not a black hue but a color hue. For example, an azo pigment, a phthalocyanine pigment, a quinacridone pigment, an isoindolinone pigment, an imidazolone pigment, a pyranthrone-based pigment, a (thio)indigo pigment, a diketopyrrolopyrrole pigment, or a dioxazine pigment can be used as the organic pigment. The organic pigment has an average particle diameter of preferably 50 nm or more and 150 nm or less, more preferably 80 nm or more and 130 nm or less. The content (mass %) of the organic pigment in the ink is preferably 0.1 mass % or more and 10.0 mass % or less based on the total mass of the ink.

Details about the resin fine particle in the ink that characterize the present invention are described later. A mass ratio of the content (mass %) of the resin fine particle in the ink to the content (mass %) of the organic pigment is preferably 0.20 time or more and 2.0 times or less. That is, a ratio "content of the resin fine particle/content of the organic pigment" is preferably 0.20 time or more and 2.0 times or less. It should be noted that a content when the mass ratio is calculated is the content of each component based on the total mass of the ink. The case where the above-mentioned mass ratio is less than 0.20 time is not preferred because voids in a pigment layer after the formation of an image cannot be sufficiently filled with the resin fine particle, and hence additional improving effects on the color developability and glossiness of the image may not be sufficiently obtained. The case where the above-mentioned mass ratio is larger than 2.0 times is not preferred either because the remaining resin fine particle after the filling of the voids deposit so that the surface smoothness of the image may conversely reduce, and hence the additional improving effects on the color developability and glossiness of the image may not be sufficiently obtained.

In addition, the total content (mass %) of the organic pigment and the resin fine particle in the ink is preferably 0.1 mass % or more and 10.0 mass % or less based on the total mass of the ink. The case where the content is less than 0.1 mass % is not preferred because the color developability and glossiness of an image may not be sufficiently obtained. On the other hand, the case where the content exceeds 10.0 mass % is not preferred because the content of the solid matter in the ink becomes so large that ejection stability needed for an ink jet ink may not be sufficiently obtained.

(Resin Fine Particle)

The resin fine particle is incorporated into the ink of the present invention. The resin fine particles exist in the so-called emulsion state in the ink. The content (mass %) of the resin fine particle in the ink is preferably 0.3 mass % or more and 5.0 mass % or less based on the total mass of the ink. A resin fine particle obtained by (co)polymerizing a general monomer can be used as the resin fine particle as long as the resin fine particle does not impair an effect of the present invention. Specifically, the resin fine particle having at least such a hydrophilic unit and a hydrophobic unit as listed below as constituent units is preferred. It should be noted that the term "(meth)acryl" as used herein refers to "acryl" and "methacryl."

Examples of the monomer serving as the hydrophilic unit after the polymerization include acid monomers such as (meth)acrylic acid, itaconic acid, maleic acid, and fumaric acid, anhydrides and salts of those acid monomers, and other anionic monomers. It should be noted that constituent cations of the salts of the acid monomers are, for example, lithium, sodium, potassium, ammonium, and organic ammonium ions. Further, examples of the monomer serving the hydrophobic unit after the polymerization include (meth)acrylic acid esters of saturated aliphatic primary alcohols, such as methyl(meth)acrylate, ethyl(meth)acrylate, and 2-ethylhexyl (meth)acrylate, and aromatic ring-containing monomers such as styrene, α-methylstyrene, p-tert-butylstyrene, phenyl (meth)acrylate, and benzyl(meth)acrylate. Further, monomers such as (meth)acrylonitrile and vinyl acetate may also be used.

In the present invention, acrylic resin fine particle having at least an acrylic component such as a hydrophilic unit derived from (meth)acrylic acid or a unit derived from a (meth)acrylic ester of an aliphatic alcohol is preferably used. Further, a copolymer having at least a hydrophilic unit derived from (meth)acrylic acid and a hydrophobic unit derived from, for example, a monomer having an aromatic ring or a (meth) acrylic ester of a saturated, aliphatic, primary alcohol is more preferably used. A copolymer having a unit derived from acrylic acid as a hydrophilic unit is particularly preferably used. The use of the resin fine particle formed of any such unit and satisfying a predetermined average particle diameter ratio enables one to sufficiently obtain the effect of the present invention. Accordingly, the incorporation of only the above-mentioned resin fine particle into the ink of the present invention suffices, and there is no need to incorporate any other resin fine particle.

The resin fine particle to be used in the present invention preferably has an acid value of 40 mgKOH/g or more and 200 mgKOH/g or less. An acid value of the resin fine particle of less than 40 mgKOH/g is not preferred because the hydrophobicity of the resin fine particle becomes high, and hence their dispersion stability is not sufficiently obtained and ejection stability needed for an ink jet ink is not sufficiently obtained in some cases. On the other hand, when the acid value of the resin fine particle exceeds 200 mgKOH/g, the additional improving effects on the color developability and glossiness of the image may not be sufficiently obtained by such a reason as described below. That is, the dispersed state of the resin fine particle in the ink is stabilized as the acid value increases, and as a result, the ratio at which the resin fine particle permeate into the lower portion of a pigment layer increases but the ratio of the resin fine particle remaining on the surface of the image reduces, and hence part of irregularities on the surface of the image and voids in the pigment layer cannot be filled in some cases.

The resin fine particle to be used in the present invention has an average particle diameter of preferably 30 nm or more and 200 nm or less, more preferably 40 nm or more and 170 nm or less. In addition, the resin fine particle to be used in the present invention preferably has a minimum film forming temperature of 15° C. or less. Meanwhile, a lower limit for the minimum film forming temperature is preferably −50° C. or more. The minimum film forming temperature of the resin fine particle can be adjusted by changing, for example, the kind and composition ratio of a monomer to be used, and the weight average molecular weight of the resin fine particle. It should be noted that the minimum film forming temperature of the resin fine particle can be measured in conformity with the test method of ISO 2115.

Although a method of synthesizing the resin fine particle to be used in the present invention is not particularly limited, the resin fine particle obtained by a soap-free polymerization method is preferably used. Further, the resin fine particle obtained by the soap-free polymerization method and having a core-shell structure is particularly preferably used. As described later, according to the investigations conducted by the inventors of the present invention, the incorporation of a polyoxyethylene alkyl ether that reduces the surface energy of the resin fine particle is effective in achieving an additionally high level of compatibility between the color developability and glossiness of the image. However, emulsion polymerization in which an emulsifier or a surfactant is used in combination at the time of synthesis involves the following risk. The emulsifier or the surfactant remains in a water dispersion liquid of the resin fine particle. The remaining emulsifier or surfactant may inhibit a reducing action of the polyoxyethylene alkyl ether on the surface energy of the resin fine particle, and as a result, high color developability and high glossiness of the image may not be obtained.

(Surfactant: Polyoxyethylene Alkyl Ether)

The polyoxyethylene alkyl ether is preferably further incorporated as a surfactant into the ink of the present invention. That is, according to the investigations conducted by the inventors of the present invention, combined use of the polyoxyethylene alkyl ether can achieve an additionally high level of compatibility between the color developability and glossiness of the image. The logic behind such conclusion is described below.

As described in the foregoing, to efficiently fill voids in a pigment layer and irregularities on the surface of the pigment layer with such resin fine particle as described above serves as an important model for improving the color developability and glossiness of an image. In contrast, the inventors of the present invention have reached the assumption that reducing the surface energy of the resin fine particle can additionally improve the ease with which the resin fine particle enter the voids in the pigment layer and recessed portions on the surface of the pigment layer. The inventors of the present invention have conducted investigations from such viewpoint, and as a result, have found that the polyoxyethylene alkyl ether is effective in reducing the surface energy of the resin fine particle.

The polyoxyethylene alkyl ether has a structure represented by a formula R—O—$(CH_2CH_2O)_n$H (where R represents an alkyl group and n represents an integer), and is one kind of surfactant. The polyoxyethylene alkyl ether that can be used in the present invention has only to satisfy the following condition. The number of carbon atoms of R (alkyl group) in the above-mentioned formula as its hydrophobic group falls within such a range that the polyoxyethylene alkyl ether has surface-active performance. For example, the number of carbon atoms is 12 to 22. Specific examples of the alkyl group include a lauryl group (12), a cetyl group (16), a stearyl group (18), an oleyl group (18), and a behenyl group (22) (the numerical value in parentheses represents the number of carbon atoms of the alkyl group). In addition, n in the above-mentioned formula, i.e., the number of ethylene oxide groups each serving as a hydrophilic group of the polyoxyethylene alkyl ether can be determined from the structure of R and an HLB value, and is preferably 10 or more. In addition, the number is preferably 50 or less.

The HLB value of the polyoxyethylene alkyl ether that can be used in the present invention determined by Griffin's method is preferably 13.0 or more and 20.0 or less. An HLB value of less than 13.0 is not preferred because the polyoxyethylene alkyl ether has so strong hydrophobicity as to hardly dissolve in water by itself, and hence the storage stability of the ink cannot be secured in some cases.

Here, Griffin's method employed for specifying the HLB value of a surfactant in the present invention is described. The HLB value based on Griffin's method is determined from the formula weight of a hydrophilic group of the surfactant and the molecular weight of the surfactant by using the following equation (1), and represents the degree of hydrophilicity or lipophilicity of the surfactant in the range of 0.0 to 20.0. The lower the HLB value, the higher the lipophilicity, i.e., hydrophobicity of the surfactant. In contrast, the higher the HLB value, the higher the hydrophilicity of the surfactant.

$$HLB \text{ value}=20\times(\text{formula weight of hydrophilic group of surfactant})/(\text{molecular weight of surfactant}) \quad \text{Eq. (1)}$$

In the present invention, the content (mass %) of the polyoxyethylene alkyl ether in the ink is preferably 0.1 mass % or more and 5.0 mass % or less based on the total mass of the ink. In addition, a mass ratio of the content (mass %) of the resin fine particle to the content (mass %) of the polyoxyethylene alkyl ether based on the total mass of the ink is preferably 1.0 time or more and 6.0 times or less. That is, a ratio "content of the resin fine particle/content of the polyoxyethylene alkyl ether" is preferably 1.0 time or more and 6.0 times or less. It should be noted that a content when the mass ratio is calculated is the content of each component based on the total mass of the ink. When the above-mentioned mass ratio is less than 1.0 time, the amount of the polyoxyethylene alkyl ether becomes so large with respect to that of the resin fine particle that the resin fine particle may be apt to enter even the lower portion in the pigment layer. The foregoing results in the following risk. The case where part of the recessed portions on the surface of the pigment layer cannot be filled with the resin fine particle or the case where voids start to exist in the upper portion in the pigment layer occurs. In any such case, the additional improving effects on the color developability and glossiness of the image may no longer be sufficiently obtained. On the other hand, when the above-mentioned mass ratio is larger than 6.0 times, the amount of the polyoxyethylene alkyl ether needed for sufficiently reducing the surface energy of the resin fine particle becomes insufficient. Accordingly, the resin fine particle may have difficulty in efficiently entering the voids in the pigment layer and the irregularities on the surface of the pigment layer, and hence the additional improving effects of the addition of the polyoxyethylene alkyl ether on the color developability and glossiness of the image may not be sufficiently obtained.

(1,2-Alkanediol)

The inventors of the present invention have found that an additionally high level of compatibility between the color developability and glossiness of the image can be achieved by further using a 1,2-alkanediol as a water-soluble organic solvent in combination simultaneously with the use of the polyoxyethylene alkyl ether described in the foregoing in the ink. The logic behind such conclusion is described below.

As described in the foregoing, combined use of the polyoxyethylene alkyl ether for improving the color developability and glossiness of an image on glossy paper can reduce the surface energy of the resin fine particle to improve the ease with which the resin fine particle enter the voids in the pigment layer and the irregularities on the surface of the pigment layer. However, it is assumed that the resin fine particle the surface energy of which has been reduced here by the addition of the polyoxyethylene alkyl ether are apt to enter even the lower portion in the pigment layer in some cases. The foregoing results in the case where part of the irregularities on the surface of the pigment layer are not filled with the resin fine particle or the case where part of the voids in the pigment layer remain. To solve the problem, the inventors of the present invention have considered that additionally high color developability and additionally high glossiness can be achieved by the following. The height of a dot formed of the ink immediately after the application of the ink to a recording medium is additionally lowered so that the formation of part of the irregularities on the surface of the pigment layer or part of the voids in the pigment layer may be suppressed. The inventors of the present invention have conducted investigations from such viewpoint, and as a result, have found that the 1,2-alkanediol can be effectively used as a water-soluble organic solvent suitable for additionally lowering the dot height.

The 1,2-alkanediol that can be used in the present invention is particularly preferably 1,2-pentanediol, 1,2-hexanediol, 1,2-heptanediol, or 1,2-octanediol having 5 to 8 carbon atoms. The case where the number of carbon atoms is 4 or less is not preferred because the lowering action on the dot height becomes small. On the other hand, the case where the number of carbon atoms is 9 or more is not preferred because the 1,2-alkanediol hardly dissolves in water by itself, and hence a certain co-solvent is needed for dissolving the 1,2-alkanediol in water. In the present invention, the content (mass %) of the 1,2-alkanediol in the ink is preferably 1.0 mass % or more and 10.0 mass % or less based on the total mass of the ink.

(Water-Soluble Urethane Resin)

A preferred mode of the ink of the present invention is, for example, such that a water-soluble urethane resin is further incorporated into the ink. It has been found that combined use of the water-soluble urethane resin in the ink according to the present invention can achieve an additionally high level of compatibility between the color developability and glossiness of the image. It should be noted that a state in which a resin is water-soluble in the present invention means that when the resin is neutralized with an alkali whose amount is equivalent to its acid value, the resin has no particle diameter. A resin that satisfies such condition is described as a water-soluble resin in the specification.

The logic behind such conclusion is described below. As described in the foregoing, in the present invention, improvements in the color developability and glossiness of the image are achieved by filling the resin fine particle into the voids in the pigment layer and the irregularities on the surface of the image. The incorporation of the water-soluble urethane resin into the ink can fill small voids between particles formed of the pigment and the resin fine particle. Here, the use of a water-soluble resin except the urethane resin may reduce the color developability and glossiness of the image because of the following reasons. Upon absorption of the aqueous medium in the ink by the recording medium, the resin permeates together with the aqueous medium, and hence the resin may not remain in the pigment layer, or even when the resin remains, the smoothness of the surface of the pigment layer is conversely impaired.

The water-soluble urethane resin to be used in the ink of the present invention is obtained by causing polyisocyanate and polyol to react with each other, and a chain extender may be further caused to react with the polyisocyanate and the polyol. Alternatively, the resin may be, for example, a hybrid type resin obtained by bonding a urethane resin and any other resin. The content (mass %) of the water-soluble urethane resin in the ink is preferably 0.1 mass % or more and 5.0 mass % or less based on the total mass of the ink.

In addition, the inventors of the present invention have made further investigations, and as a result, have found that additionally high levels of color developability and glossiness of the image are obtained by using a polyether-based urethane resin having a poly(oxytetramethylene) structure among the water-soluble urethane resins. The inventors of the present invention have considered the reason for the foregoing to be as described below. The poly(oxytetramethylene) structure interacts with the surface of a pigment particle to enable the urethane resin to exist near the pigment particle. Accordingly, the urethane resin can be caused to exist in the pigment layer with improved efficiency, and as a result, the additionally high levels of color developability and glossiness of the image are obtained.

(Any Other Resin)

Another resin as well as the resin dispersant for the organic pigment and the resin fine particle described above, and the above-mentioned water-soluble urethane resin and the like to be added as required can be added to the ink of the present invention. Such resin may be used as a dispersant for dispersing the organic pigment and the resin fine particle in the aqueous medium in an additionally stable fashion, or may be added to the ink for any other purpose.

(Aqueous Medium)

Water or an aqueous medium as a mixed solvent of water and a water-soluble organic solvent is incorporated into the ink of the present invention. Deionized water is preferably used as the water. In the present invention, the ink is particularly preferably an aqueous ink containing at least water as an aqueous medium. The water content (mass %) in the ink is preferably 50.0 mass % or more and 95.0 mass % or less based on the total mass of the ink. In addition, the content (mass %) of the water-soluble organic solvent in the ink is preferably 3.0 mass % or more and 50.0 mass % or less based on the total mass of the ink. It should be noted that the content of the water-soluble organic solvent includes the content of the 1,2-alkanediol. Any one of the solvents that can be used in ink jet inks such as alcohols, alkylene glycols, glycol ethers, and nitrogen-containing compounds can be used as the water-soluble organic solvent, and one or two or more kinds thereof can be incorporated into the ink.

(Any Other Component)

The ink of the present invention may contain a water-soluble organic compound that is solid at normal temperature such as urea or a derivative thereof, trimethylolpropane, or trimethylolethane in addition to the above-mentioned components. Alternatively, the ink may contain any one of the various additives such as a surfactant except the polyoxyethylene alkyl ether described above, a pH adjustor, a rust inhibitor, an antiseptic, a fungicide, an antioxidant, and an anti-reduction agent as required so as to have desired physical property values.

(Method of Preparing Ink)

The ink of the present invention described above, which can be prepared in accordance with an ordinary method, is particularly preferably prepared by, for example, such a method as described below. First, a mixture of an aqueous solution containing the resin to be used as a dispersant and the pigment is subjected to a dispersion treatment so that a pigment dispersion containing the pigment dispersed with the resin dispersant may be obtained. Next, the resultant pigment dispersion and the other components such as the resin fine particle are mixed so that the ink may be prepared. When the water-soluble urethane resin is used, each pigment is preferably dispersed with the resin dispersant in advance before mixing with the other components such as the water-soluble urethane resin. Such method is particularly suitable in the present invention because the action of the water-soluble urethane resin to be added to the ink for achieving an additionally high level of compatibility between the color developability and glossiness of the image can be efficiently exerted by the method.

<Ink Cartridge>

An ink cartridge of the present invention has an ink and an ink storage portion for storing the ink, and the ink stored in the ink storage portion is the ink of the present invention described above. The structure of the ink cartridge is, for example, such that the ink storage portion is formed of a negative pressure generating member-storing chamber for storing a negative pressure generating member for holding the ink in a state of being impregnated with the ink by a negative pressure, and an ink storage portion for storing the ink in a state in which the negative pressure generating member is not impregnated with the ink. Alternatively, the ink storage portion may be of such a construction as to have no such ink storage chamber as described above and to hold the total amount of the ink in a state in which the negative pressure generating member is impregnated with the ink, or may be of such a construction as to have no negative pressure generating member and to store the total amount of the ink in a state in which the negative pressure generating member is not impregnated with the ink. Further, the ink cartridge may be of a shape formed so as to have the ink storage portion and a recording head.

<Ink Jet Recording Method>

An ink jet recording method of the present invention is a method involving ejecting the ink of the present invention described above from a recording head according to an ink jet system to record an image on a recording medium. A system for ejecting the ink is, for example, a system involving applying mechanical energy to the ink or a system involving applying thermal energy to the ink. In the present invention, an ink jet recording method involving utilizing thermal energy is particularly preferably adopted. Any step of the ink jet recording method other than the use of the ink of the present invention has only to be a known one. In addition, any medium may be used as the recording medium. Preferably used in the present invention is such a recording medium as described below. The pigment and the resin fine particle in the ink can be caused to exist on or near the surface of the recording medium. Such recording medium is, for example, a recording medium having an ink-receiving layer, which is suitable because the medium provides a significant effect particularly when used as a recording medium such as glossy paper having a glossy surface.

The ink of the present invention can be used as an ink set as well by being combined with any other ink. One or two or more kinds can be selected from, for example, cyan, magenta, yellow, black, red, green, and blue hues as the hues of the other inks. In addition, multiple inks each having the same hue as that of the above-mentioned ink and different from each other in pigment content may be used as inks that form the ink set. A combination of such multiple inks is, for example, a combination of inks having cyan hues such as dark cyan, middle cyan, and light cyan inks, or a combination of inks having magenta hues such as dark magenta, middle magenta, and light magenta inks. In addition, a clear ink free of any coloring material may be used as an ink that forms the ink set. Of course, the present invention is not limited to the inks with those hues, and the names of the inks such as dark, middle, and light are not limited thereto either.

Next, the present invention is described more specifically by way of examples and comparative examples. However, the present invention is not limited by the following examples and any modification can be made as long as the modification does not deviate from the gist of the present invention. It should be noted that the terms "part(s)" and "%" in the following description refer to "part(s) by mass" and "mass %," respectively unless otherwise stated.

<Conditions for Measuring Average Particle Diameter>

Hereinafter, methods of measuring the average particle diameters of a pigment and resin fine particles are described. A grain size distribution-measuring apparatus according to a dynamic light scattering method (Nanotrac UPA-EX150; manufactured by Nikkiso Co., Ltd.) was used for measuring the average particle diameters. The average particle diameter of the organic pigment was measured by diluting a pigment dispersion with pure water so that a loading index fell within the range of 1 to 2 with the above-mentioned apparatus under the following measurement conditions.

SetZero: 30 s
Number of times of measurement: three times
Measuring time: 180 seconds
Refractive index: 1.5

In addition, the average particle diameter of the resin fine particles was measured by diluting the prepared resin fine particles with pure water 50-fold on a volume basis with the above-mentioned apparatus under the following measurement conditions.

SetZero: 30 s
Number of times of measurement: three times
Measuring time: 180 seconds
Refractive index: 1.5

It should be noted that the inventors of the present invention have confirmed that values for the respective average particle diameters measured for the pigment dispersion and the water dispersion liquid of the resin fine particles as described above were identical to values for the average particle diameters of the organic pigment and the resin fine particles in the ink. Of course, the apparatus, conditions, and the like for measuring the average particle diameters are not limited to those described above.

<Preparation of Pigment Dispersion>

(Pigment Dispersion 1)

A pigment dispersion 1 containing an organic pigment dispersed with a resin was prepared by the following procedure. 25 Parts of a C.I. Pigment Blue 15:3 (manufactured by Clariant), 20 parts of a dispersant, and 70 parts of ion-exchanged water were mixed, and were then dispersed with a batch type vertical sand mill for 3 hours. A styrene-acrylic acid copolymer (water-soluble resin) having an acid value of 210 mgKOH/g and a weight average molecular weight of 8,000 was used as the dispersant. The copolymer was used in a state of an aqueous solution obtained by neutralization with a 10% aqueous solution of sodium hydroxide. After that, coarse particles were removed by a centrifugal separation treatment. Further, the remainder was filtered with a cellulose acetate filter having a pore size of 3.0 μm (manufactured by ADVANTEC) under pressure. Thus, the pigment dispersion 1 was obtained. The content of the pigment in the pigment dispersion 1 was 25.0%, the content of the resin dispersant (solid matter) therein was 20.0%, and the average particle diameter of the pigment was 95 nm.

(Pigment Dispersion 2)

A pigment dispersion 2 was obtained in the same manner as in the preparation of the pigment dispersion 1 except that the kind of the dispersant was changed to a benzyl methacrylate-acrylic acid copolymer (water-soluble resin) having an acid value of 210 mgKOH/g and a weight average molecular weight of 8,000. The content of the pigment in the pigment dispersion 2 was 25.0%, the content of the resin dispersant (solid matter) therein was 20.0%, and the average particle diameter of the pigment was 95 nm.

(Pigment Dispersion 3)

A pigment dispersion 3 was obtained in the same manner as in the preparation of the pigment dispersion 1 except that the kind of the pigment was changed to a solid solution of a C.I. Pigment Red 202 and a C.I. Pigment Violet 19. The content of the pigment in the pigment dispersion 3 was 25.0%, the content of the resin dispersant (solid matter) therein was 20.0%, and the average particle diameter of the pigment was 115 nm. It should be noted that a Chromophtal Jet Magenta 2BC (manufactured by BASF) was used as the above-mentioned solid solution.

(Pigment Dispersion 4)

A commercially available pigment dispersion CAB-O-JET 250C (manufactured by Cabot Corporation) containing a self-dispersible pigment was used as a pigment dispersion 4. The content of the pigment in the pigment dispersion 4 was 10.0% and the average particle diameter of the pigment was 110 nm. It should be noted that the pigment in the pigment dispersion is a organic pigment (C.I. Pigment Blue 15:4) but is not dispersed with any resin.

<Synthesis of Resin Fine Particles>

(Synthesis of Resin Fine Particles Having Core-Shell Structure by Soap-Free Polymerization Method)

(Synthesis of Shell Polymer)

A shell polymer was synthesized in accordance with the following procedure. 100.0 Parts of ethylene glycol monobutyl ether were added to a four-necked flask provided with a stirring machine, a reflux condenser, and a nitrogen gas-introducing pipe. After that, a nitrogen gas was introduced into the reaction system, and then the temperature of the contents was increased to 110° C. under stirring. A mixture of 38.0 parts of 2-ethylhexyl acrylate, 34.0 parts of methyl methacrylate, and 28.0 parts of acrylic acid, and a solution of 1.3 parts of t-butyl peroxide (polymerization initiator) in ethylene glycol monobutyl ether were dropped to the flask over 3 hours. After that, aging was performed for 2 hours, and furthermore, ethylene glycol monobutyl ether was removed under reduced pressure. Thus, a solid resin was obtained. The shell polymer thus obtained was dissolved by adding potassium hydroxide whose amount was equivalent to its acid value and an appropriate amount of ion-exchanged water at 80° C. Thus, an aqueous solution of the shell polymer the content of the shell polymer (solid matter) of which was 30% was obtained. The shell polymer had an acid value of 216 mgKOH/g and a weight average molecular weight of 15,000.

(Synthesis of Resin Fine Particles Having Core-Shell Structure)

Resin fine particles P1 to P5 having core-shell structures different from one another in average particle diameter were synthesized in accordance with the following soap-free polymerization method. The aqueous solution of the shell polymer obtained in the foregoing was added to a four-necked flask provided with a stirring machine, a reflux condenser, and a nitrogen gas-introducing pipe so that a solid matter amount shown in Table 1 was obtained. After that, a nitrogen gas was introduced into the reaction system, and then the temperature of the solution was increased to 80° C. under stirring. A mixture containing styrene and ethyl methacrylate at a mass ratio of 4:1 was added to the flask so that a solid matter amount shown in Table 1 was obtained. After that, a liquid prepared by dissolving 1.0 part of potassium persulfate (polymerization initiator) in 16.7 parts of water was dropped to the flask over 3 hours. Then, aging was performed for 2 hours. After that, the solid content was adjusted with an appropriate amount of ion-exchanged water. Thus, water dispersion liquids of the resin fine particles P1 to P5 the content of the resin fine particles (solid matter) of each of which was 10.0% were obtained. Table 1 shows the average particle diameters and minimum film forming temperatures of the respective resin fine particles.

TABLE 1

Synthesis conditions and characteristics of resin fine particles

| Kinds of resin fine particles | Synthesis conditions | | Characteristics of resin fine particles | |
|---|---|---|---|---|
| | Loading amount of shell polymer (solid matter: part(s)) | Loading amount of mixture (solid matter: part(s)) | Average particle diameter [nm] | Minimum film forming temperature [° C.] |
| P1 | 21.0 | 14.0 | 125 | Less than 5° C. |
| P2 | 18.0 | 12.0 | 110 | Less than 5° C. |
| P3 | 12.0 | 8.0 | 90 | Less than 5° C. |
| P4 | 9.0 | 6.0 | 58 | Less than 5° C. |
| P5 | 6.0 | 4.0 | 47 | Less than 5° C. |

(Synthesis of Resin Fine Particles Having Core-Shell Structure by Emulsion Polymerization Method)

Resin fine particles P6 were synthesized by an emulsion polymerization method in accordance with the following procedure. 100.0 Parts of water were added to a four-necked flask provided with a stirring machine, a reflux condenser, and a nitrogen gas-introducing pipe. After that, a nitrogen gas was introduced into the reaction system, and then the temperature of the water was increased to 80° C. under stirring. 40.0 Parts of water, 0.4 part of sodium lauryl sulfate, 8.0 parts of 2-ethylhexyl acrylate, and 32.0 parts of methyl methacrylate were mixed so that a monomer emulsified product A was prepared. The monomer emulsified product A and 4.0 parts of a 5% aqueous solution of potassium persulfate were dropped to the above-mentioned flask over 1 hour. After that, aging was performed for 2 hours so that polymer fine particles serving as a core polymer were synthesized. Separately from the foregoing, 60.0 parts of water, 0.6 part of sodium lauryl sulfate, 16.8 parts of 2-ethylhexyl acrylate, 26.4 parts of methyl methacrylate, and 16.8 parts of acrylic acid were mixed so that a monomer emulsified product B was prepared. The monomer emulsified product B and 15.0 parts of a 5% aqueous solution of potassium persulfate were dropped to the same flask as that described above over 1 hour. After that, aging was performed for 2 hours. Then, the solid content was adjusted with an appropriate amount of ion-exchanged water. Thus, a water dispersion liquid of the resin fine particles P6 the content of the resin fine particles (solid matter) of which was 10.0% was obtained. The resin fine particles had an average particle diameter of 110 nm and a minimum film forming temperature of 8° C.

<Synthesis of Water-Soluble Urethane Resin>

(Synthesis of Water-Soluble Urethane Resin U1 Having Polyoxytetramethylene Structure)

Synthesis was performed with a four-necked flask provided with a temperature gauge, a stirring machine, a nitrogen-introducing pipe, and a condenser. First, 480 g of a poly(oxytetramethylene)glycol having a number average molecular weight of 2,000 (average number of repetitions of oxytetramethylene units=27.5), 282 g of isophorone diisocyanate, and 0.007 g of dibutyltin dilaurate were loaded into the flask. After that, the contents were subjected to a reaction under a nitrogen gas atmosphere at 100° C. for 1 hour. After that, the resultant was cooled to 65° C. or less. 0.007 Gram of dimethylolpropionic acid, neopentyl glycol, and 447.8 g of methyl ethyl ketone were added to the resultant, and then the mixture was subjected to a reaction at 80° C. for 16 hours. After that, 408.1 g of methyl ethyl ketone and methanol were added to terminate the reaction. Thus, a polyether-based polyurethane resin U1 having a linear polyoxytetramethylene structure, the resin having an acid value of 55 mgKOH/g and a weight average molecular weight in terms of polystyrene of 33,000, was obtained. The urethane resin U1 contains the poly(oxytetramethylene) structure at 54%, and has a polyaddition reaction structure of neopentyl glycol and isophorone diisocyanate. Then, the solid content was adjusted with an appropriate amount of ion-exchanged water. Thus, an aqueous solution of the urethane resin U1 the content of the water-soluble urethane resin (solid matter) of which was 20.0% was obtained.

(Synthesis of Water-Soluble Urethane Resin U2 Having No Polyoxytetramethylene Structure)

Synthesis was performed in the same manner as in the method of synthesizing the urethane resin U1 except that 480 g of a polypropylene glycol having a number average molecular weight of 2,000 were used instead of the poly(oxytetramethylene)glycol. Thus, a linear polyether-based polyurethane resin U2 having an acid value of 55 mgKOH/g and a weight average molecular weight in terms of polystyrene of 29,000 was obtained. The urethane resin U2 contains the poly(oxytetramethylene) structure at 54%, and has a polyaddition reaction structure of neopentyl glycol and isophorone diisocyanate. Then, the solid content was adjusted with an appropriate amount of ion-exchanged water. Thus, an aqueous solution of the urethane resin U2 the content of the water-soluble urethane resin (solid matter) of which was 20.0% was obtained.

<Preparation of Ink>

The respective components (unit: %) shown in the upper stage of Table 2-1, 2-2 and 2-3 were mixed and sufficiently stirred. After that, the mixture was filtered with a cellulose acetate filter having a pore size of 0.8 μm (manufactured by ADVANTEC) under pressure. Thus, each ink was prepared. The polyethylene glycol in Table 2-1, 2-2 and 2-3 has an average molecular weight of 1,000. An Acetylenol E100 (manufactured by Kawaken Fine Chemicals Co., Ltd.) is an ethylene oxide adduct of acetylene glycol, and is a nonionic surfactant. A NIKKOL BC-20 (manufactured by Nikko Chemicals Co., Ltd.) is a polyoxyethylene cetyl ether, and is a surfactant having a number of moles of added ethylene oxide groups of 20 and an HLB value based on Griffin's method of 15.7. In addition, a NIKKOL BO-50 (manufactured by Nikko Chemicals Co., Ltd.) is a polyoxyethylene oleyl ether, and is a surfactant having a number of moles of added ethylene oxide groups of 50 and an HLB value based on Griffin's method of 17.8.

The lower stage of Table 2-1, 2-2 and 2-3 shows the respective values for a ratio of the average particle diameter of resin fine particles to the average particle diameter of an organic pigment, a mass ratio of the content of the resin fine particles to the content of the organic pigment, and a mass ratio of the content of the resin fine particles to the content of the polyoxyethylene alkyl ether. It should be noted that the ratio of the average particle diameter of the resin fine particles to the average particle diameter of the organic pigment is a value determined as described below. 3 Grams of a prepared ink were centrifuged at 80,000 rpm for 10 hours. The average particle diameter of the resin fine particles in the supernatant and the average particle diameter of the pigment in the lower layer (precipitate) were each measured, and then a ratio between the above-mentioned average particle diameters was calculated.

TABLE 2-1

Composition of ink

| | Example | | | | | | | | | |
|---|---|---|---|---|---|---|---|---|---|---|
| | 1 | 2 | 3 | 4 | 5 | 6 | 7 | 8 | 9 | 10 |
| Pigment dispersion 1 | 12.0 | | | 12.0 | 12.0 | 12.0 | 12.0 | 12.0 | 12.0 | 12.0 |
| Pigment dispersion 2 | | 12.0 | | | | | | | | |
| Pigment dispersion 3 | | | 12.0 | | | | | | | |
| Pigment dispersion 4 | | | | | | | | | | |
| Water dispersion liquid of resin fine particles P1 | | | | | | | | | | |
| Water dispersion liquid of resin fine particles P2 | | | | | | 20.0 | | | | |
| Water dispersion liquid of resin fine particles P3 | 20.0 | 20.0 | 20.0 | 20.0 | | | 2.0 | 6.0 | 55.0 | 62.0 |
| Water dispersion liquid of resin fine particles P4 | | | | | 20.0 | | | | | |
| Water dispersion liquid of resin fine particles P5 | | | | | | | | | | |
| Water dispersion liquid of resin fine particles P6 | | | | | | | | | | |
| Urethane resin U1 | 3.0 | 3.0 | 3.0 | 3.0 | 3.0 | 3.0 | 3.0 | 3.0 | 3.0 | 3.0 |
| Urethane resin U2 | | | | | | | | | | |
| Glycerin | 10.0 | 10.0 | 10.0 | 10.0 | 10.0 | 10.0 | 10.0 | 10.0 | 10.0 | 10.0 |
| Polyethylene glycol | 5.0 | 5.0 | 5.0 | 5.0 | 5.0 | 5.0 | 5.0 | 5.0 | 5.0 | 5.0 |
| Acetylenol E100 | 0.5 | 0.5 | 0.5 | 0.5 | 0.5 | 0.5 | 0.5 | 0.5 | 0.5 | 0.5 |
| Triethanolamine | | | | | | | | | | |
| 1,2-Hexanediol | 5.0 | 5.0 | 5.0 | 5.0 | 5.0 | 5.0 | 5.0 | 5.0 | 5.0 | 5.0 |
| NIKKOL BC-20 | 1.0 | 1.0 | 1.0 | | 1.0 | 1.0 | 0.2 | 0.6 | 1.0 | 1.1 |
| NIKKOL BO-50 | | | | 1.0 | | | | | | |
| Water | 43.5 | 43.5 | 43.5 | 43.5 | 43.5 | 43.5 | 62.3 | 57.9 | 8.5 | 1.4 |
| Ratio of average particle diameter of resin fine particles to average particle diameter of organic pigment (time(s)) | 0.95 | 0.95 | 0.78 | 0.95 | 0.61 | 1.2 | 0.95 | 0.95 | 0.95 | 0.95 |
| Mass ratio of resin fine particles to organic pigment (time(s)) | 0.67 | 0.67 | 0.67 | 0.67 | 0.67 | 0.67 | 0.07 | 0.20 | 1.8 | 2.1 |
| Mass ratio of resin fine particles to polyoxyethylene alkyl ether (time(s)) | 2.0 | 2.0 | 2.0 | 2.0 | 2.0 | 2.0 | 1.0 | 1.0 | 5.5 | 5.6 |

TABLE 2-2

Composition of ink

| | Example | | | | | | | | |
|---|---|---|---|---|---|---|---|---|---|
| | 11 | 12 | 13 | 14 | 15 | 16 | 17 | 18 | 19 |
| Pigment dispersion 1 | 12.0 | 12.0 | 12.0 | 12.0 | 12.0 | 12.0 | 12.0 | 12.0 | 12.0 |
| Pigment dispersion 2 | | | | | | | | | |
| Pigment dispersion 3 | | | | | | | | | |
| Pigment dispersion 4 | | | | | | | | | |
| Water dispersion liquid of resin fine particles P1 | | | | | | | | | |
| Water dispersion liquid of resin fine particles P2 | | | | | | | | | |

TABLE 2-2-continued

Composition of ink

| | Example 11 | 12 | 13 | 14 | 15 | 16 | 17 | 18 | 19 |
|---|---|---|---|---|---|---|---|---|---|
| Water dispersion liquid of resin fine particles P3 | 20.0 | 20.0 | 20.0 | 20.0 | 20.0 | 20.0 | | 20.0 | 20.0 |
| Water dispersion liquid of resin fine particles P4 | | | | | | | | | |
| Water dispersion liquid of resin fine particles P5 | | | | | | | | | |
| Water dispersion liquid of resin fine particles P6 | | | | | | | 20.0 | | |
| Urethane resin U1 | 3.0 | 3.0 | 3.0 | 3.0 | 3.0 | 3.0 | 3.0 | | |
| Urethane resin U2 | | | | | | | | 3.0 | |
| Glycerin | 10.0 | 10.0 | 10.0 | 10.0 | 10.0 | 10.0 | 10.0 | 10.0 | 10.0 |
| Polyethylene glycol | 5.0 | 5.0 | 5.0 | 5.0 | 5.0 | 5.0 | 5.0 | 5.0 | 5.0 |
| Acetylenol E100 | 0.5 | 0.5 | 0.5 | 0.5 | 0.5 | 0.5 | 0.5 | 0.5 | 0.5 |
| Triethanolamine | | | | | | | | | |
| 1,2-Hexanediol | 5.0 | 5.0 | 5.0 | 5.0 | 5.0 | | 5.0 | 5.0 | 5.0 |
| NIKKOL BC-20 | | 2.2 | 2.0 | 0.34 | 0.32 | 1.0 | 1.0 | 1.0 | 1.0 |
| NIKKOL BO-50 | | | | | | | | | |
| Water | 44.5 | 42.3 | 42.5 | 44.16 | 44.18 | 48.5 | 43.5 | 43.5 | 46.5 |
| Ratio of average particle diameter of resin fine particles to average particle diameter of organic pigment (time(s)) | 0.95 | 0.95 | 0.95 | 0.95 | 0.95 | 0.95 | 1.2 | 0.95 | 0.95 |
| Mass ratio of resin fine particles to organic pigment (time(s)) | 0.67 | 0.67 | 0.67 | 0.67 | 0.67 | 0.67 | 0.67 | 0.67 | 0.67 |
| Mass ratio of resin fine particles to polyoxyethylene alkyl ether (time(s)) | — | 0.91 | 1.0 | 5.9 | 6.3 | 2.0 | 2.0 | 2.0 | 2.0 |

TABLE 2-3

Composition of ink

| | Comparative Example 1 | 2 | 3 | 4 | 5 | 6 |
|---|---|---|---|---|---|---|
| Pigment dispersion 1 | 12.0 | 12.0 | | 12.0 | | 12.0 |
| Pigment dispersion 2 | | | | | | |
| Pigment dispersion 3 | | | | 30.0 | | 30.0 |
| Pigment dispersion 4 | | | 20.0 | | | |
| Water dispersion liquid of resin fine particles P1 | | | | | | |
| Water dispersion liquid of resin fine particles P2 | | | | | 20.0 | |
| Water dispersion liquid of resin fine particles P3 | | | 20.0 | | | |
| Water dispersion liquid of resin fine particles P4 | | 20.0 | | | | |
| Water dispersion liquid of resin fine particles P5 | | | | | | |
| Water dispersion liquid of resin fine particles P6 | | | | | | |
| Urethane resin U1 | 3.0 | 3.0 | 3.0 | 3.0 | | |
| Urethane resin U2 | | | | | | |
| Glycerin | 10.0 | 10.0 | 10.0 | 10.0 | 10.0 | 12.0 |
| Polyethylene glycol | 5.0 | 5.0 | 5.0 | 5.0 | 5.0 | |
| Acetylenol E100 | 0.5 | 0.5 | 0.5 | 0.5 | 0.5 | |
| Triethanolamine | | | | | | 0.9 |
| 1,2-Hexanediol | 5.0 | 5.0 | 5.0 | 5.0 | 5.0 | 15.0 |
| NIKKOL BC-20 | 1.0 | 1.0 | 1.0 | 1.0 | | |
| NIKKOL BO-50 | | | | | | |
| Water | 43.5 | 43.5 | 25.5 | 63.5 | 29.5 | 60.1 |
| Ratio of average particle diameter of resin fine particles to average particle diameter of organic pigment (time(s)) | 0.49 | 1.3 | 0.82 | — | 1.0 | — |
| Mass ratio of resin fine particles to organic pigment (time(s)) | 0.67 | 0.67 | 0.67 | 0.00 | 0.67 | 0.00 |
| Mass ratio of resin fine particles to polyoxyethylene alkyl ether (time(s)) | 2.0 | 2.0 | 2.0 | 0.0 | — | — |

<Evaluation>

An ink cartridge filled with each of the inks obtained in the foregoing was mounted on the red position of an ink jet recording apparatus capable of ejecting ink by the action of thermal energy (trade name: PIXUS Pro9500; manufactured by Canon Inc.). In the recording apparatus, an image recorded under the following conditions is defined as having a recording duty of 100%. Eight ink droplets each having a mass of 3.5 nanograms (ng) are applied at a resolution of 600 dpi×600 dpi to a unit region measuring 1/600 inch by 1/600 inch. Then, a pattern including ten kinds of solid images whose recording duties ranged from 10% to 100% in increments of 10% was recorded on a Canon Photographic Paper-Gloss Gold (manufactured by Canon Inc.). In the present invention, in the following evaluation criteria, a level A or higher was regarded as being an acceptable level, a level AA was regarded as being an excellent level, and levels B and C were regarded as being unacceptable levels. Table 3 shows the results of the evaluation.

(Evaluation for Color Developability)

The a* and b* of each of the ten kinds of images in the recorded matter obtained in the foregoing based on a CIE L*a*b* colorimetric system were measured with a Spectrolino (manufactured by Gretag Macbeth). Then, a value for a chroma $c^*=\{(a^*)^2+(b^*)^2\}^{1/2}$ was calculated, and an evaluation for color developability was performed on the basis of the highest c* value among the ten kinds of images. Evaluation criteria are as described below.

AA: The c* was 75 or more.
A: The c* was 73 or more and less than 75.
B: The c* was 70 or more and less than 73.
C: The c* was less than 70.

(Evaluation for Glossiness)

The 20° gloss value of the image having a recording duty of 100% in the recorded matter obtained in the foregoing was measured with a Microhazemeter Plus (manufactured by BYK-Gardner GmbH), and then an evaluation for glossiness was performed. Evaluation criteria are as described below.

AA: The 20° gloss value was 55 or more.
A: The 20° gloss value was 50 or more and less than 55.
B: The 20° gloss value was 45 or more and less than 50.
C: The 20° gloss value was less than 45.

TABLE 3

Results of evaluations

|  |  | Color developability | Glossiness |
|---|---|---|---|
| Example | 1 | AA | AA |
|  | 2 | AA | AA |
|  | 3 | AA | AA |
|  | 4 | AA | AA |
|  | 5 | AA | AA |
|  | 6 | AA | AA |
|  | 7 | A | A |
|  | 8 | AA | AA |
|  | 9 | AA | AA |
|  | 10 | A | A |
|  | 11 | A | A |
|  | 12 | A | A |
|  | 13 | AA | AA |
|  | 14 | AA | AA |
|  | 15 | A | A |
|  | 16 | A | A |
|  | 17 | A | A |
|  | 18 | AA | AA |
|  | 19 | A | A |
| Comparative Example | 1 | B | B |
|  | 2 | B | B |
|  | 3 | C | C |
|  | 4 | C | A |
|  | 5 | C | C |
|  | 6 | C | A |

It should be noted that the color developability and glossiness of Example 18 slightly paled in comparison with those of Example 1.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-194534, filed Aug. 31, 2010, which is hereby incorporated by reference herein in its entirety.

What is claimed is:

1. An ink, comprising:
   an organic pigment;
   a resin for dispersing the organic pigment;
   a resin fine particle; and
   a water-soluble urethane resin,
   wherein an average particle diameter of the resin fine particle is 0.60 times or more and 1.2 times or less as large as an average particle diameter of the organic pigment.

2. An ink according to claim 1, wherein a mass ratio of a content (mass %) of the resin fine particle to a content (mass %) of the organic pigment based on a total mass of the ink is 0.20 times or more and 2.0 times or less.

3. An ink according to claim 1, further comprising a polyoxyethylene alkyl ether as a surfactant.

4. An ink according to claim 3, wherein a mass ratio of a content (mass %) of the resin fine particle to a content (mass %) of the polyoxyethylene alkyl ether based on a total mass of the ink is 1.0 times or more and 6.0 times or less.

5. An ink according to claim 1, further comprising a 1,2-alkanediol as a water-soluble organic solvent.

6. An ink according to claim 1, wherein the resin fine particle is polymerized by employing a soap-free polymerization method.

7. An ink cartridge, comprising an ink and an ink storage portion for storing the ink, wherein the ink comprises the ink according to claim 1.

8. An ink jet recording method, comprising ejecting ink from a recording head according to an ink jet system to record an image on a recording medium, wherein the ink comprises the ink according to claim 1.

9. An ink jet recording method according to claim 8, wherein the recording medium is a glossy paper.

10. An ink according to claim 1, wherein the organic pigment has an average particle diameter of 50 nm or more and 150 nm or less.

11. An ink according to claim 1, wherein the resin fine particle has an average particle diameter of 30 nm or more and 200 nm or less.

12. An ink according to claim 1, wherein the resin fine particle has an acid value of 40 mgKOH/g or more and 200 mgKOH/g or less.

13. An ink according to claim 1, wherein the water-soluble urethane resin is a polyether-based urethane resin.

14. An ink according to claim 1, wherein the water-soluble urethane resin has a poly(oxytetramethylene) structure.

* * * * *